United States Patent [19]
Saltel

[11] Patent Number: 6,044,906
[45] Date of Patent: Apr. 4, 2000

[54] INFLATABLE TUBULAR SLEEVE FOR TUBING OR OBTURATING A WELL OR PIPE

[75] Inventor: Jean-Louis Saltel, Le Rheu, France

[73] Assignee: Drillflex, France

[21] Appl. No.: 09/011,508

[22] PCT Filed: Aug. 2, 1996

[86] PCT No.: PCT/FR96/01226

§ 371 Date: Jun. 4, 1998

§ 102(e) Date: Jun. 4, 1998

[87] PCT Pub. No.: WO97/06346

PCT Pub. Date: Feb. 20, 1997

[30] Foreign Application Priority Data

Aug. 4, 1995 [FR] France .................................. 95 09694

[51] Int. Cl.[7] .................................................. E21B 33/127
[52] U.S. Cl. ............................................ 166/187; 166/192
[58] Field of Search ................................. 166/187, 192, 166/195, 387

[56] References Cited

U.S. PATENT DOCUMENTS

| | | | |
|---|---|---|---|
| 4,781,249 | 11/1988 | Wood | 166/187 |
| 4,886,117 | 12/1989 | Patel | 277/334 |
| 4,913,232 | 4/1990 | Cheymol et al. | 166/285 |
| 4,979,570 | 12/1990 | Mody | 166/387 |
| 5,000,261 | 3/1991 | Fitzgibbon, Jr. | 166/187 |
| 5,417,289 | 5/1995 | Carisella | 166/387 |
| 5,469,919 | 11/1995 | Carisella | 166/387 |
| 5,709,765 | 1/1998 | Herbert | 165/293 |

FOREIGN PATENT DOCUMENTS

| | | | |
|---|---|---|---|
| 27 28 056 | 6/1977 | Germany | F16L 55/16 |
| 2 247 263 | 2/1992 | United Kingdom | E21B 33/127 |
| WO 91/18180 | 11/1991 | WIPO | E21B 17/00 |
| WO 94/21887 | 9/1994 | WIPO | E21B 33/14 |
| WO 94/25655 | 11/1994 | WIPO | D04C 1/06 |

*Primary Examiner*—Frank S. Tsay
*Attorney, Agent, or Firm*—Blakely Sokoloff Taylor & Zafman

[57] ABSTRACT

A radially deformable inflatable tubular sleeve for tubing or obturating a well (P) or a pipe. The sleeve includes a tube and a series of breakable restraining rings positioned along the tube. The rings are arranged so that each ring breaks one after the other in the longitudinal direction of the sleeve when the tube is inflated by an internal fluid under pressure. As a ring breaks, liquid (B) present in the well is moved progressively forward so as to prevent pockets forming on the outside of the tubing.

14 Claims, 3 Drawing Sheets

INFLATABLE TUBULAR SLEEVE FOR TUBING OR OBTURATING A WELL OR PIPE

BACKGROUND OF THE INVENTION

1. Field of the Invention

The present invention concerns an inflatable tubular sleeve for tubing or obturating a well or a pipe.

2. Background Information

Flexible tubular preforms that can be hardened in situ have already been proposed for tubing an oil drilling well and for similar applications; they are adapted to be put in place in a radially folded or non-expanded state—in which state they have a small overall size in the radial direction—and then unfolded and/or expanded radially by application of internal pressure before being hardened in situ, for example by polymerization.

Preforms of this type are described in documents WO-91/18180, WO-94/21887 and WO-94/25655, for example.

The expression "radially deformable" is used to refer to sleeves that can be radially deployed by simple unfolding (as is the case with the preform described in WO-91/18180, for example) or that can simply be expanded radially (without unfolding) by increasing their diameter due to the effect of internal pressure or that can be successively unfolded and then expanded (as is the case with the matrix and the preform of document WO-94/25655, for example).

The invention has been conceived as a sleeve used as a tool for expanding a preform, this tool being of the same general type as the preform expander tool—called a matrix—described in WO-94/25655, cited above; this matrix is initially attached to the preform, being mounted inside the latter. After inflation of the matrix/preform combination and solidification of the preform the matrix is pulled out.

However, the invention applies equally to sleeves used as tools for obturating the wall of a well, to prevent fluid leaks, this tool being commonly known in the art as a "packer".

In one possible embodiment, the tubular sleeve that is the subject matter of the invention can also consist in the preform itself.

During the operation of radial deformation (by unfolding and/or expansion) of a sleeve of the above kind within a well or a pipe, if the expansion of the preform is not controlled there is a risk of pockets of liquid forming that are trapped between the sleeve and the wall of the well or the pipe. In oil drilling and like applications it is common for the well or the pipe to be filled with water, mud or some other liquid.

This is obviously a problem, since the sleeve or the preform surrounding it cannot be pressed correctly against the wall of the well or the pipe and the tubing obtained is not perfectly cylindrical and is not firmly anchored.

An attempt has been made to overcome this difficulty in the case of inflatable membranes equipping obturating tools (packers) by varying the composition of the material of the membrane—or sleeve—(based on synthetic rubber) from one end to the other, so that its resistance to radial expansion varies progressively. Accordingly, when a fluid under pressure is introduced into the tool the membrane expands progressively from one end of the tool to the other, expelling in a regular manner the liquid trapped between the membrane and the well or the pipe as expansion proceeds, towards the end at which the resistance to expansion is highest, i.e. the end at which expansion occurs last.

Although in theory this technique is satisfactory, it is difficult and costly to implement because the composition of the material of the sleeve is not the same throughout the product, the variation in its composition is difficult to control and, most importantly, it cannot be applied to long sleeves.

For this reason the objective of the present invention is to propose a sleeve of the kind just mentioned adapted to be used for tubing a well or a pipe, in particular for oil industry applications, the sleeve having a structure such that it also expands progressively from one end to the other, in a manner that is totally controlled and independently of its length.

In accordance with the invention, this result is achieved by the virtue of the fact that the wall of the sleeve is provided with a series of identical breakable restraining rings offset axially relative to each other and adapted to break one after the other in the longitudinal direction of the sleeve when the latter is inflated by an internal fluid under pressure.

SUMMARY OF THE INVENTION

In accordance with a number of advantageous, non-limiting features of the invention:

- said rings are regularly spaced at a constant distance from each other;
- the sleeve has a section with no rings;
- the sleeve has a section provided with rings having a substantially lower breaking threshold than the other rings;
- the section with no rings or provided with rings having a lower breaking threshold is an end area of the sleeve;
- the section with no rings or provided with rings having a lower breaking threshold is a middle area of the sleeve;
- the rings are toroidal;
- the rings are embedded inside the wall of the sleeve;
- the sleeve is formed of a synthetic elastomer material;
- the sleeve constitutes a tool for expanding a flexible and radially deformable preform that can be hardened in situ to form the tubing of the well or the pipe;
- the sleeve is initially attached to the preform and is extractable at the end of operation;
- the sleeve constitutes a tool ("packer") for obturating the well or the pipe;
- the sleeve constitutes a flexible and radially deformable preform that can be hardened in situ to form the tubing of the well or the pipe after it has solidified.

Other features and advantages of the invention will become apparent from the description and the appended drawings which show by way of example only non-limiting embodiments of the invention.

DETAILED DESCRIPTION OF THE INVENTION

Figure 1:
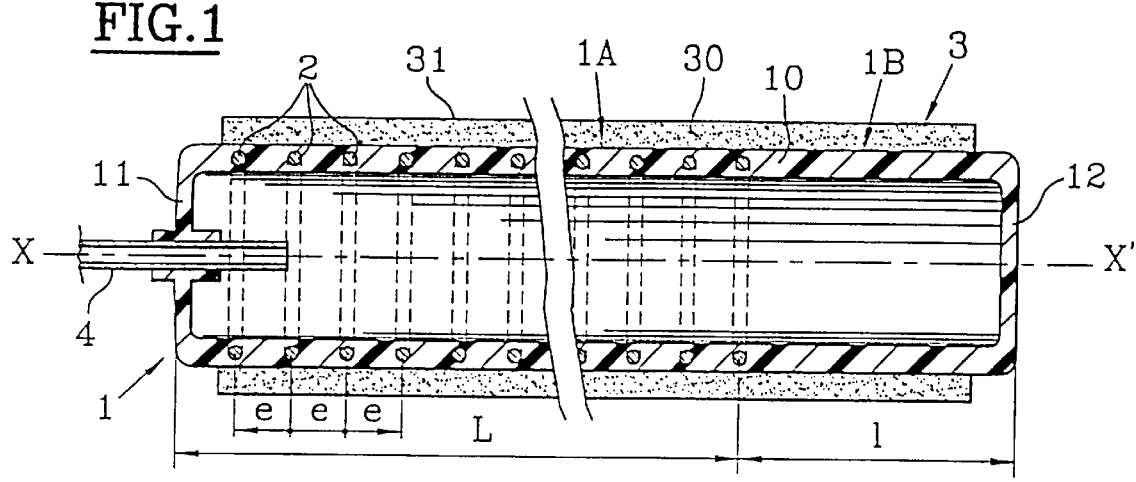
FIG. 1 is a view in longitudinal section of a combination comprising an inflatable tubular sleeve in accordance with the invention accommodated inside a flexible preform that can be hardened in situ.

FIG. 1 shows a tool 1 for expanding a flexible preform that can be hardened in situ—inside a well or a pipe—by polymerization.

This tool 1—or matrix—consists in a cylindrical tubular sleeve of generally elongate shape with a cylindrical wall 10. The sleeve is closed at both ends by transverse walls 11, 12 one of which—in this instance the wall 11—has a nozzle 4 passed through it and sealed to it which can be connected to a pipe 40 for introducing a fluid under pressure, for example water, into the interior of the sleeve in order to cause it to expand radially.

The material of the sleeve is a synthetic rubber (elastomer), for example, or an elastomer-based material. The material is the same and its mechanical characteristics are exactly the same along the entire length of the sleeve, which can therefore be made in long lengths.

The sleeve 1 is inserted into the interior of a tubular preform 3 that is initially flexible but can be hardened in situ by polymerization.

The preform has a wall made of a resin 30 that is initially fluid (malleable) but can be hardened by heating it to polymerize it. This resin is confined between a flexible elastic material outer skin 31 and the wall 10 of the sleeve, which serves as an inner skin.

The combination has an axis XX'.

The combination is of the same general type as that described in document WO-94/25655 (see in particular FIGS. 9 through 12).

Temporary connecting means, not shown, initially attach the sleeve 1 to the preform 3 surrounding it. They break at the end of operation (after the preform is hardened) so that the interior sleeve can be pulled out, as explained hereinafter.

According to one essential feature of the invention, the wall of the sleeve 1 is provided with a series of breakable restraining rings that are offset axially from each other and break when an expansion force due to an internal pressure intended to expand them radially exceeds a predetermined threshold.

All of the rings 2 have substantially the same breaking threshold.

The rings are regularly spaced with a constant distance e between them.

As can be seen in FIG. 1, not all of the sleeve 1 is provided with rings. The latter are provided only on a section 1A that corresponds to the major part of the sleeve, of length L, starting from the same end as the nozzle 4—i.e. the upstream end.

By convention, "upstream" end means the end of the well that opens to the exterior, from which the inflating fluid arrives from the well head.

The section at the opposite (downstream) end with a short length l (very much less than L), is not provided with rings.

The rings 2 are preferably toroidal, i.e. they have a circular shape and a circular cross-section, although this is not mandatory.

Each ring can advantageously comprise a filament, of plastics material or metal, for example, wound upon itself in several turns to form a ring.

The rings are preferably coated with a substance encouraging slipping relative to the elastomer material in which they are embedded. This substance is silicone oil, for example.

This reduces the risk of the wall of the sleeve being torn when the rings break and facilitates sliding of the rings over the wall 10 of the sleeve, which is necessary when it expands.

The following dimensional values are given by way of non-limiting example:
 total length L+l of sleeve: 20 m.
 length L of section 1A equipped with rings: 18 m.
 length l of section 1B with no rings: 2 m.
 distance e between rings: 10 mm.
 thickness (radial) of wall 10 of matrix: 10 mm.
 thickness (radial) of wall 30 of preform: 10 mm.
 diameter of matrix/preform combination before inflation (as in FIG. 2): 100 mm.
 diameter of this combination after inflation (FIG. 3): 160 mm.

Figure 4:
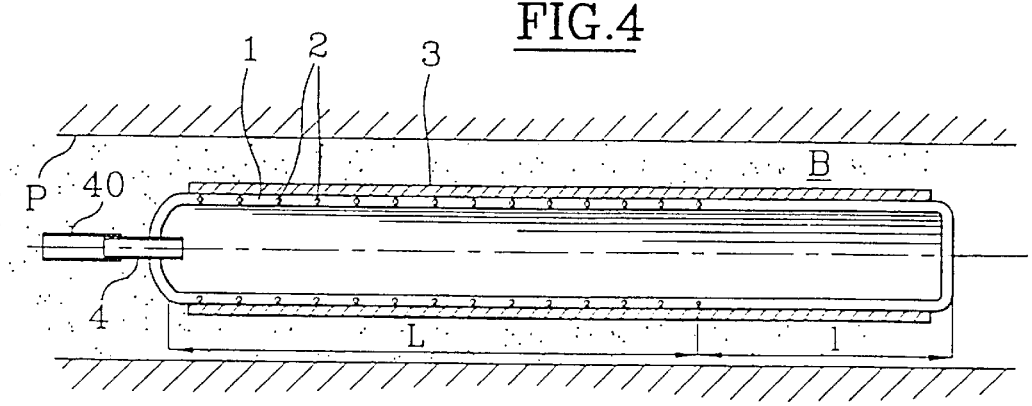
FIGS. 4 through 8 are schematic views showing various steps in the tubing of a well using the combination shown in FIGS. 1 and 2.

FIG. 4 shows the initial phase of tubing an oil drilling well that has an approximately cylindrical wall P.

In the drawings the well is horizontal; it can extend in any direction, however, in particular vertically, the invention remaining applicable in this case.

The diameter of the preform/matrix combination is chosen so that in the radially expanded state the preform is properly pressed against the wall P in order to serve as tubing for the well.

The matrix/preform combination is put into place using a tool known in itself from the outside of the well (from left to right as shown in FIG. 4); in FIG. 4, the matrix/preform combination is in the required position, facing the area of the wall P to be tubed.

The combination is immersed in a liquid B such as mud that is present in the well.

A liquid such as water under pressure can be introduced into the interior of the sleeve 1 from the well head via the pipe 40 and the nozzle 4.

In a manner that is well known in itself, this pressurized fluid expands the sleeve 1 and the preform around it, the combination being expanded radially against the wall P.

In the absence of the rings 2, this expansion would occur in an uncontrolled manner, with the risk of producing on the outside of the matrix/preform combination pockets in which a certain volume of the liquid B would be trapped, impeding the tubing operation.

By virtue of the arrangement in accordance with the invention, due to the pressure p of the pressurized liquid introduced into the sleeve (arrow F in FIG. 5) the downstream area 1B expands first because it carries no restraining rings and therefore has a greater amplitude for deformation than the remainder 1A of the sleeve. This expansion is accompanied by a reduction in the axial dimension of this part 1B which is pressed against the wall P by the section of preform around it. During this expansion, the mud that was outside this area is expelled in the upstream and downstream directions, as shown by the arrows i in FIG. 5.

The risk of pockets forming around the section 1B is small because this area has a short length l.

If the pressure of the liquid contained inside the sleeve is further increased, to a value $P_1$ greater than p, the ring 2 at the downstream end eventually breaks. As can readily be shown by calculation, it is this ring which is subjected to the greatest expansion force. Once it has broken, it is the next ring on its upstream side that breaks.

Figure 5:
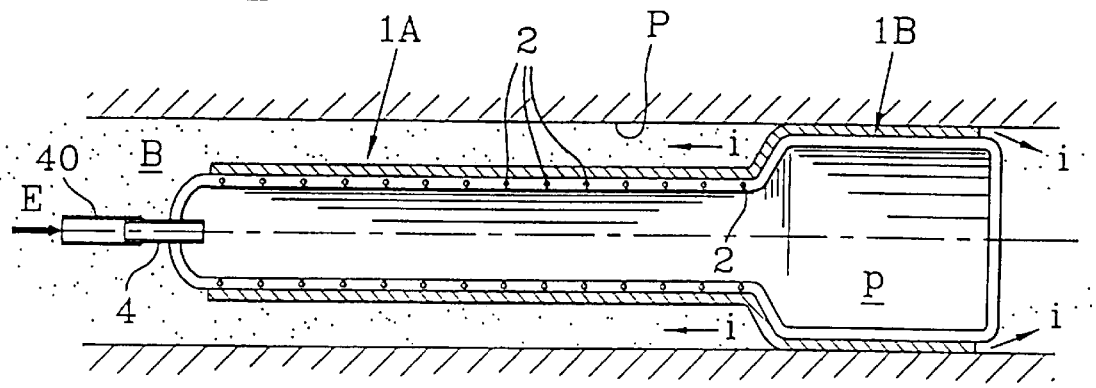
Figure 6:
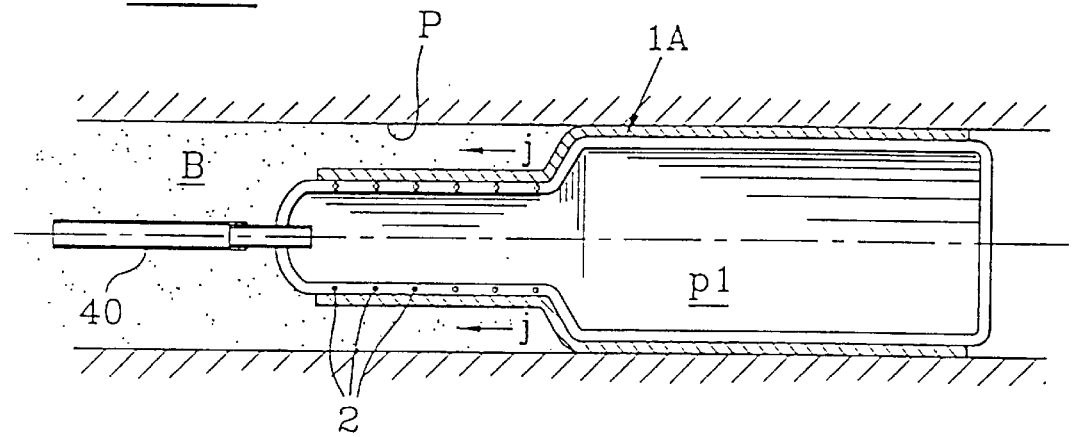

All of the rings 2 therefore break progressively, one after the other, in the downstream to upstream direction (from right to left in FIGS. 5 and 6).

Because of this controlled propagation of the expansion front, the liquid B between the preform and the wall P is progressively expelled, also in the upstream to downstream direction, as symbolized by the arrows j. This expulsion avoids the formation of pockets, the disadvantage of which is indicated above.

Once all of the rings have broken and the preform is pressed entirely against the wall P, it is polymerized by heating it; this operation can be effected by introducing a hot liquid into the interior of the matrix, for example, and/or by the Joule effect using an electrical conductor (heater wire) embedded in the matrix or in the preform.

The inflation pressures p and $p_1$ are respectively in the order of 5 bars and 15 bars, for example.

Figure 3:
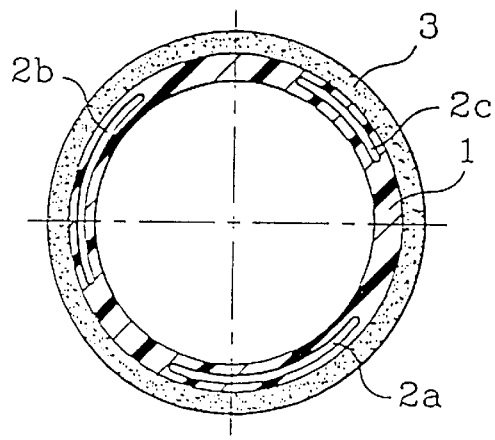

FIG. 3 shows an expansion operation during which the ring 2 has broken into three fragments 2a, 2b and 2c. It could break at a single point or into a larger number of fragments. It goes without saying that the rings must also be flexible so that their curvature can change to follow that of the sleeve after the ring breaks. As already stated, the rings are advantageously coated to encourage relative sliding of the ring— or the fragments of the ring—relative to the material of the wall of the sleeve after the ring breaks.

Figure 7:
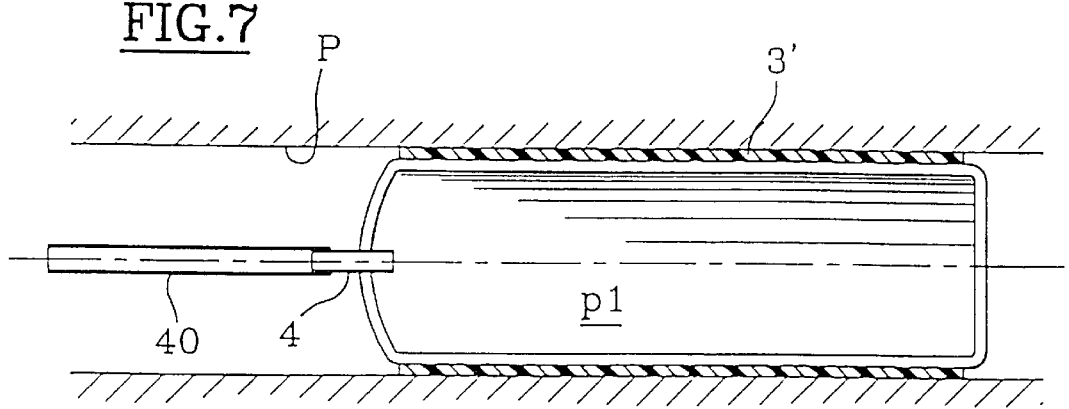
Figure 8:
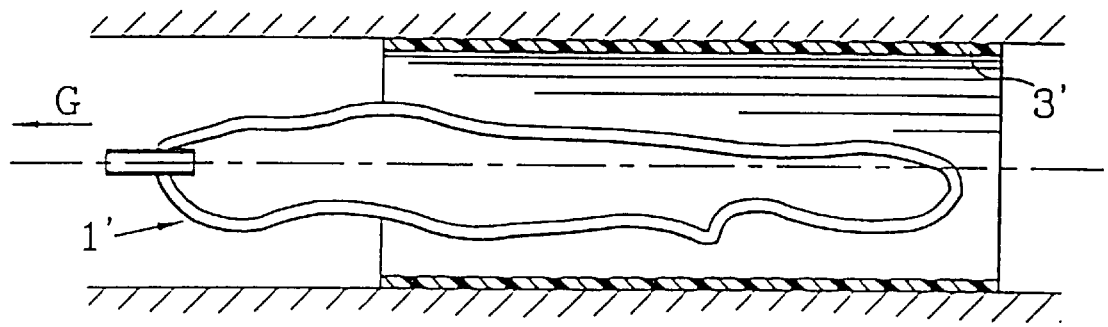

After the preform solidifies to become a rigid tube 3' (FIG. 7) the matrix is pulled out, as symbolized by the arrow G in FIG. 8.

In the embodiment just described the matrix/preform assembly is expanded by radial expansion alone. It goes without saying that the invention applies equally to combinations initially folded longitudinally (into a "U" or snail shape), as shown in particular in WO-91/18180 or in WO-94/25655 (FIGS. 6A and 6B).

Figure 2:
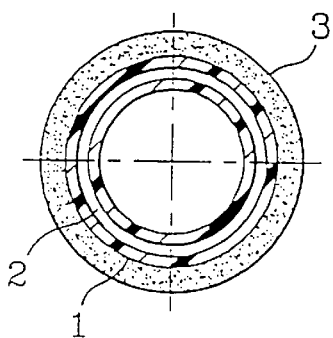
FIGS. 2 and 3 are views in cross-section of the preform from FIG. 1, respectively before and after radial expansion.

The ring 5 in the variant shown in FIG. 9 has a main section 5A of length L provided with rings 6 similar to the rings 2 described with reference to FIGS. 1 and 2. These rings all have substantially the same, relatively high breaking threshold.

The upstream end section 5B is also provided with a set of similar rings 7 but with a significantly lower breaking threshold than the rings 6. This breaking threshold is not negligible, however.

The sleeve 5 can therefore contain a fluid at a non-negligible pressure without deforming radially.

This makes it possible to impart some rigidity to the sleeve by introducing a fluid under pressure into it without the risk of causing it to expand. This can be beneficial for introducing the sleeve into some wells or pipes, in particular non-rectilinear wells or pipes, the rigidity of the sleeve facilitating guiding it.

When the sleeve has been positioned correctly, the internal pressure is increased to cause it to expand in two stages, firstly expansion of the end 5B by progressive breaking of the rings 7 and then—with a still higher pressure— progressive expansion of the part 5A by the rings 6 breaking in succession.

Figure 9:
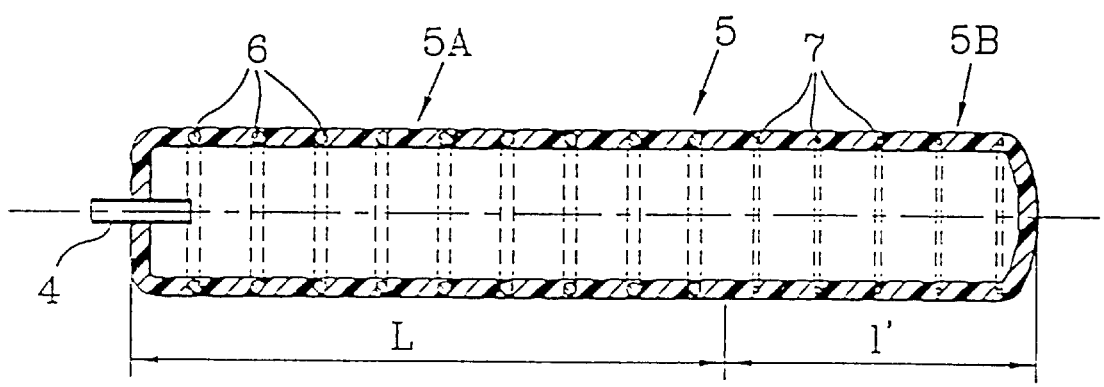
FIGS. 9 and 10 are schematic representations of variants of the sleeve from FIG. 1 (without the associated preform).

The sleeve 5 is also associated with a preform, like the sleeve 1 of the previous embodiment, but to simplify FIG. 9 the latter is not shown.

Figure 10:
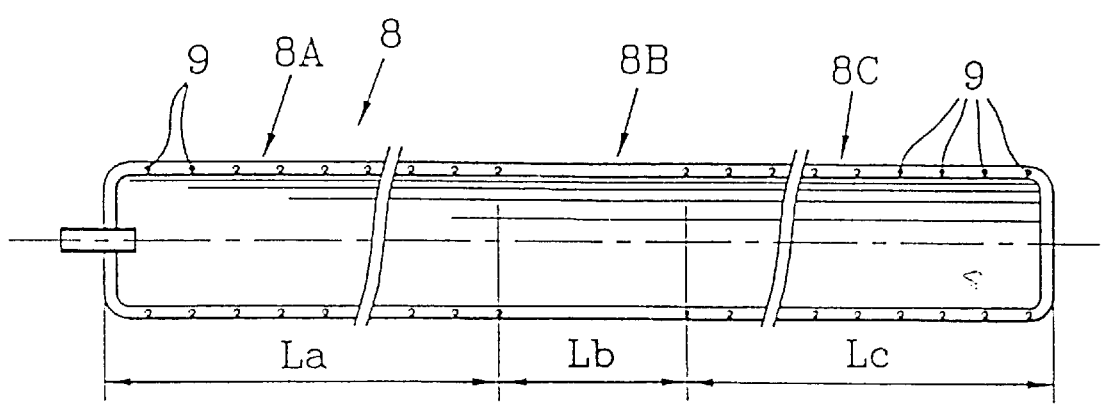

Likewise, the sleeve 8 shown schematically in FIG. 10 is associated with a preform that is not shown.

In this variant of the sleeve, a middle section 8B having a short length $L_B$ carries no restraining rings. On the other hand, rings 9 similar to the rings 2 of the first embodiment are provided on each of the long end sections 8A and 8C (respective lengths $L_A$ and $L_C$).

In this variant, the middle area 8B expands first and is pressed against the wall of the well or the pipe, the expansion of the sleeve propagating progressively from this area towards each end of the sleeve, simultaneously expelling the liquid contained in the well or the pipe towards each of these ends.

Of course, the middle area 8B could also be provided with rings similar to the rings 7 from FIG. 9 with a lower breaking threshold than the rings 9.

The restraining rings with which a radially deformable sleeve is provided in accordance with the present invention are not necessarily embedded in the wall of said sleeve. They could be on the exterior of the latter.

The sleeve of the invention is not necessarily a tool used to expand an initially flexible preform that can be hardened in situ.

The sleeve of the invention can equally be used as an obturator tool of the "packer" type.

The sleeve could constitute the preform itself, the restraining rings being embedded in the polymerizable resin of the preform, for example, between two elastic skins.

I claim:

1. A radially deformable inflatable tubular sleeve (1; 5; 8) for tubing or obturating a well (P) or a pipe, the sleeve comprisings:

a tube having a wall, and a series of breakable restraining rings (2; 6; 9) offset axially relative to each other alone the wall and adapted to break one after the other in the longitudinal direction of the sleeve when said tube is inflated by an internal fluid under pressure.

2. The sleeve of claim 1 wherein said rings (2; 6; 9) are regularly spaced at a constant distance from each other.

3. The sleeve of claim 1 wherein the wall includes a first section (1B; 8B) with no rings offset axially relative to each other along the wall.

4. The sleeve of claim 3 wherein one of said first section (1B; 8B) with no rings and said second section provided with rings (7) having a lower breaking threshold is an end area of the sleeve.

5. The sleeve of claim 3 wherein one of said first section (8B) with no rings and said second section provided with rings (7) having a lower breaking threshold is a middle area of the sleeve.

6. The sleeve of claim 1 wherein the wall includes a second section (5B) provided with rings (7) having a substantially lower breaking threshold than the remaining rings (6).

7. The sleeve of claim 6, where said second section provided with rings (7) having a lower breaking threshold than the remaining rings (6) forms an end area of the sleeve.

8. The sleeve of claim 6, where said first section provided with rings (7) having a lower breaking threshold than the other rings (6) forms a middle area of the sleeve.

9. The sleeve of claim 1 wherein said rings (2; 6, 7; 9) are toroidal.

10. The sleeve of claim 1 wherein said rings (2; 6, 7; 9) are embedded inside said wall of said tube.

11. The sleeve of claim 1 wherein the tube is formed of a synthetic elastomer material.

12. The sleeve of claim 1, further comprising:

a flexible and radially deformable preform (3) disposed about the tube, the preform (3) having means for hardening in situ so as to form the tubing (3') of the well (P) or the pipe.

13. The sleeve of claim 10 wherein the tube has a first position attached to the preform (3) and a second position that is removed from the preform (3).

14. A tool for obturating a well (P) or a pipe, comprising:

a sleeve (1; 5; 8) having a tube and a plurality of breakable restraining rings (2; 6; 9) disposed alone a longitudinal axis of the tube; and a preform (3) disposed about the tube.

* * * * *

UNITED STATES PATENT AND TRADEMARK OFFICE
CERTIFICATE OF CORRECTION

PATENT NO. : 6,044,906
DATED : April 4, 2000
INVENTOR(S) : Saltel

It is certified that error appears in the above-identified patent and that said Letters Patent is hereby corrected as shown below:

Column 6, claim 1,
Line 16, delete "comprisings:" and insert -- comprising: --.
Line 19, delete "relative to each other alone the wall" and insert -- relative to each other along the wall --.

Column 6, claim 13,
Line 57, delete, "The sleeve of claim 10" and insert -- The sleeve of claim 12 --.

Column 6, claim 14,
Line 62, delete "disposed alone a longitudinal" and insert -- disposed along a longitudinal --.

Signed and Sealed this

Eighteenth Day of September, 2001

Attest:

NICHOLAS P. GODICI
*Attesting Officer*  *Acting Director of the United States Patent and Trademark Office*